United States Patent
Brillant et al.

(10) Patent No.: US 10,061,375 B2
(45) Date of Patent: Aug. 28, 2018

(54) POWER MODE CONFIGURATION FOR TOUCH SENSORS

(71) Applicant: Atmel Corporation, San Jose, CA (US)

(72) Inventors: Gregory Brillant, Trondheim (NO); Trond Jarle Pedersen, Saupstad (NO)

(73) Assignee: Atmel Corporation, Chandler, AZ (US)

( * ) Notice: Subject to any disclaimer, the term of this patent is extended or adjusted under 35 U.S.C. 154(b) by 219 days.

(21) Appl. No.: 15/226,606

(22) Filed: Aug. 2, 2016

(65) Prior Publication Data
US 2018/0039319 A1    Feb. 8, 2018

(51) Int. Cl.
    *G06F 1/32*     (2006.01)
    *G06F 3/041*     (2006.01)
    *G06F 3/044*     (2006.01)

(52) U.S. Cl.
    CPC .......... *G06F 1/3262* (2013.01); *G06F 1/3215* (2013.01); *G06F 3/044* (2013.01); *G06F 3/0416* (2013.01)

(58) Field of Classification Search
    CPC .... G06F 1/3262; G06F 1/3215; G06F 3/0416; G06F 3/044
    See application file for complete search history.

(56) References Cited

U.S. PATENT DOCUMENTS

| | | | |
|---|---|---|---|
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 7,986,313 B2 | 7/2011 | Krah | |
| 8,031,094 B2 | 10/2011 | Hotelling | |
| 8,031,174 B2 | 10/2011 | Hamblin | |
| 8,040,326 B2 | 10/2011 | Hotelling | |

(Continued)

FOREIGN PATENT DOCUMENTS

WO    WO 2012/129247 A2    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61,454,894, filed Mar. 21, 2011, Rothkopf.

*Primary Examiner* — Dmitriy Bolotin
(74) *Attorney, Agent, or Firm* — Baker Botts L.L.P.

(57) ABSTRACT

In one embodiment, a system includes a touch sensor, measurement circuits, and a monitoring circuit. The measurement circuits are respectively coupled to electrodes of the touch sensor. Each measurement circuit includes a first component, a second component, and a third component. The first component of each measurement circuit is activated in a first power mode and the second and third components of each measurement circuit are deactivated in the first power mode. The monitoring circuit is coupled to the measurement circuits and includes a first component, a second component, and a third component. The monitoring circuit is configured to perform operations in the first power mode. The operations include receiving signals from the measurement circuits and generating an output signal that is proportional to a sum of the signals received from the measurement circuits. A value of the generated output signal indicates whether activity has occurred on the touch sensor.

20 Claims, 4 Drawing Sheets

(56) References Cited

U.S. PATENT DOCUMENTS

| | | |
|---|---|---|
| 8,049,732 B2 | 11/2011 | Hotelling |
| 8,125,456 B2 | 2/2012 | Krah |
| 8,179,381 B2 | 5/2012 | Frey |
| 8,217,902 B2 | 7/2012 | Chang |
| 8,497,690 B2 | 7/2013 | Bartling |
| 8,723,824 B2 | 5/2014 | Myers |
| 2008/0309635 A1 | 12/2008 | Matsuo |
| 2009/0315854 A1 | 12/2009 | Matsuo |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |
| 2014/0077827 A1 | 3/2014 | Seguine |
| 2014/0118287 A1* | 5/2014 | Miyamoto .............. G06F 3/044 345/173 |
| 2014/0132558 A1 | 5/2014 | Jang |
| 2014/0152602 A1* | 6/2014 | Miyamoto ............ G06F 3/0416 345/173 |
| 2016/0018447 A1* | 1/2016 | Nys ....................... H03M 3/414 324/76.24 |
| 2016/0306456 A1* | 10/2016 | Slamkul ................ G06F 3/0418 |

* cited by examiner

POWER MODE CONFIGURATION FOR TOUCH SENSORS

TECHNICAL FIELD

This disclosure generally relates to touch sensors.

BACKGROUND

According to an example scenario, a touch sensor detects the presence and position of an object (e.g., a user's finger or a stylus) within a touch-sensitive area of touch sensor array overlaid on a display screen, for example. In a touch-sensitive-display application, a touch sensor array allows a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other device. A control panel on a household or other appliance may include a touch sensor.

There are a number of different types of touch sensors, such as for example resistive touch sensors, surface acoustic wave touch sensors, and capacitive touch sensors. In one example, when an object physically touches a touch screen within a touch sensitive area of a touch sensor of the touch screen (e.g., by physically touching a cover layer overlaying a touch sensor array of the touch sensor) or comes within a detection distance of the touch sensor (e.g., by hovering above the cover layer overlaying the touch sensor array of the touch sensor), a change in capacitance may occur within the touch screen at a position of the touch sensor of the touch screen that corresponds to the position of the object within the touch sensitive area of the touch sensor. A touch sensor controller processes the change in capacitance to determine the position of the change of capacitance within the touch sensor (e.g., within a touch sensor array of the touch sensor).

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Figure 1:
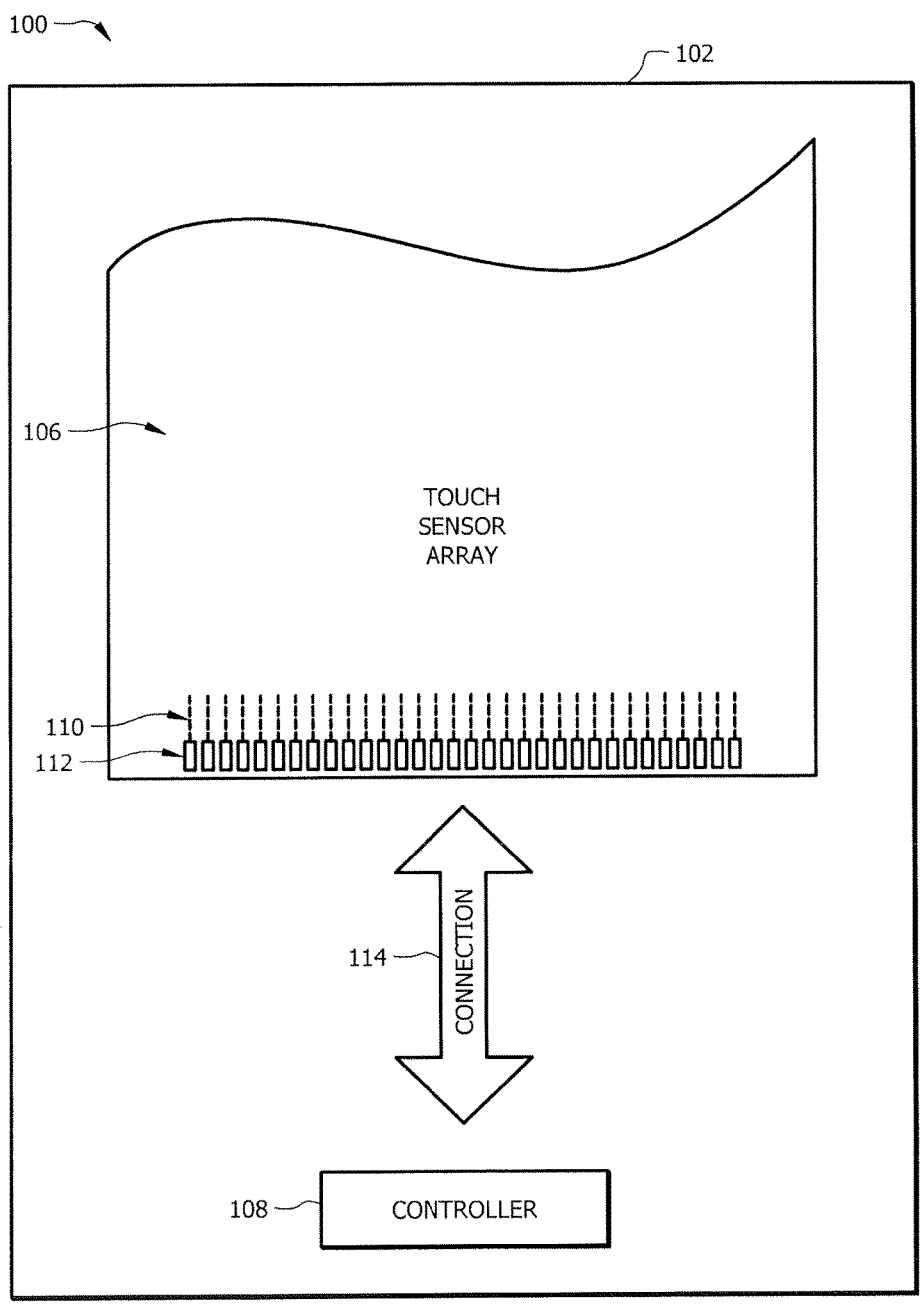
FIG. 1 illustrates an example system that includes a touch sensor, according to an embodiment of the present disclosure.

Devices that include touch sensors often spend significant time in a state in which the touch sensor is unused. For example, a user may place the device in a stand-by mode, or sleep mode, in which in an embodiment, a display of the device is turned off and the touch sensor of the device is not actively detecting the presence of an object or is detecting the presence of an object on a reduce basis relative to when the device is fully powered. As another example, the device may be in use for some background application (e.g., playing music), but the touch sensor of the device may go unused while that background application is operating. When the device is in a stand-by mode or the touch sensor is otherwise unused, for example, it may be desirable to conserve power that would otherwise be consumed by the touch sensor and other components. Detecting when to power on the touch sensor (e.g., a touch sensor controller of the touch sensor) can introduce power-consuming activities and present additional problems.

An embodiment of the present disclosure provides an idle power mode for a touch sensor. In idle power mode, the power consumption of operating the touch sensor is reduced, in response to the touch sensor detecting limited activity on the touch screen for example. In the idle power mode, the touch sensor may detect the occurrence of a potential touch but may omit processing to detect a location of a touch, the number of touches, or the nature of the touch (e.g., finger, glove, stylus). Reducing the power consumption of operating a touch sensor during idle power mode may include deactivating (i.e., powering off) certain components of each measurement circuit (which may also be referred to as a slice) of the touch sensor and determining whether activity has occurred based on a sum of the signals received from each of the measurement circuits, as described below. As a particular example, embodiments of the present disclosure use a monitoring circuit to receive signals from an amplifier of each of the measurement circuits while an integrator and an analog-to-digital converter ("ADC") of each of the measurement circuits are deactivated. The monitoring circuit generates an output signal proportional to a sum of the signals received from the measurement circuits, and the generated output signal indicates whether some activity has occurred on the touch sensor.

In one embodiment, a system includes a touch sensor, a plurality of measurement circuits, and a monitoring circuit. The touch sensor includes a plurality of electrodes. The plurality of measurement circuits are respectively coupled to the plurality of electrodes of the touch sensor, wherein each measurement circuit includes a first component, a second component, and a third component. The first component of each measurement circuit is activated in a first power mode and the second component and the third component of each measurement circuit are deactivated in the first power mode. The monitoring circuit is coupled to the first component of each measurement circuit. The monitoring circuit includes a first component, a second component, and a third component. The first component, the second component, and the third component of the monitoring circuit are activated in the first power mode. The monitoring circuit performs operations in the first power mode, which include receiving respective signals from the plurality of measurement circuits and generating an output signal that is proportional to a sum of the signals received from the plurality of measurement circuits. A value of the generated output signal indicates whether activity has occurred on the touch sensor.

FIG. 1 illustrates an example system 100 that includes a touch sensor 102, according to an embodiment of the present disclosure. Touch sensor 102 includes a touch sensor array 106 and a touch sensor controller 108. Touch sensor array 106 and touch sensor controller 108 detect the presence and position of a touch or the proximity of an object within a touch-sensitive area of touch sensor array 106.

Touch sensor array 106 includes one or more touch-sensitive areas. In one embodiment, touch sensor array 106 includes an array of electrodes disposed on one or more substrates, which may be made of a dielectric material. Reference to a touch sensor array may encompass both the electrodes of touch sensor array 106 and the substrate(s) on which they are disposed. Alternatively, reference to a touch sensor array may encompass the electrodes of touch sensor array 106, but not the substrate(s) on which they are disposed.

In one embodiment, an electrode is an area of conductive material forming a shape, such as for example a disc, square, rectangle, thin line, other shape, or a combination of these shapes. One or more cuts in one or more layers of conductive material may (at least in part) create the shape of an electrode, and the area of the shape may (at least in part) be bounded by those cuts. In one embodiment, the conductive material of an electrode occupies approximately 100% of the area of its shape. For example, an electrode may be made of indium tin oxide (ITO) and the ITO of the electrode may occupy approximately 100% of the area of its shape (sometimes referred to as 100% fill). In one embodiment, the conductive material of an electrode occupies less than 100% of the area of its shape. For example, an electrode may be made of fine lines of metal or other conductive material (FLM), such as for example copper, silver, or a copper- or silver-based material, and the fine lines of conductive material may occupy approximately 5% of the area of its shape in a hatched, mesh, or other pattern. Reference to FLM encompasses such material. Although this disclosure describes or illustrates particular electrodes made of particular conductive material forming particular shapes with particular fill percentages having particular patterns, this disclosure contemplates, in any combination, electrodes made of other conductive materials forming other shapes with other fill percentages having other patterns.

The shapes of the electrodes (or other elements) of a touch sensor array 106 constitute, in whole or in part, one or more macro-features of touch sensor array 106. One or more characteristics of the implementation of those shapes (such as, for example, the conductive materials, fills, or patterns within the shapes) constitute in whole or in part one or more micro-features of touch sensor array 106. One or more macro-features of touch sensor array 106 may determine one or more characteristics of its functionality, and one or more micro-features of touch sensor array 106 may determine one or more optical features of touch sensor array 106, such as transmittance, refraction, or reflection.

Although this disclosure describes a number of example electrodes, the present disclosure is not limited to these example electrodes and other electrodes may be implemented. Additionally, although this disclosure describes a number of example embodiments that include particular configurations of particular electrodes forming particular nodes, the present disclosure is not limited to these example embodiments and other configurations may be implemented. In one embodiment, a number of electrodes are disposed on the same or different surfaces of the same substrate. Additionally or alternatively, different electrodes may be disposed on different substrates. Although this disclosure describes a number of example embodiments that include particular electrodes arranged in specific, example patterns, the present disclosure is not limited to these example patterns and other electrode patterns may be implemented.

A mechanical stack contains the substrate (or multiple substrates) and the conductive material forming the electrodes of touch sensor array 106. For example, the mechanical stack may include a first layer of optically clear adhesive (OCA) beneath a cover panel. The cover panel may be clear and made of a resilient material for repeated touching, such as for example glass, polycarbonate, or poly(methyl methacrylate) (PMMA). This disclosure contemplates the cover panel being made of any material. The first layer of OCA may be disposed between the cover panel and the substrate with the conductive material forming the electrodes. The mechanical stack may also include a second layer of OCA and a dielectric layer (which may be made of PET or another material, similar to the substrate with the conductive material forming the electrodes). As an alternative, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including touch sensor array 106 and touch sensor controller 108. For example, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm.

Although this disclosure describes a particular mechanical stack with a particular number of particular layers made of particular materials and having particular thicknesses, this disclosure contemplates other mechanical stacks with any number of layers made of any materials and having any thicknesses. For example, in one embodiment, a layer of adhesive or dielectric may replace the dielectric layer, second layer of OCA, and air gap described above, with there being no air gap in the display.

One or more portions of the substrate of touch sensor array 106 may be made of polyethylene terephthalate (PET) or another material. This disclosure contemplates any substrate with portions made of any material(s). In one embodiment, one or more electrodes in touch sensor array 106 are made of ITO in whole or in part. Additionally or alternatively, one or more electrodes in touch sensor array 106 are made of fine lines of metal or other conductive material. For example, one or more portions of the conductive material may be copper or copper-based and have a thickness of approximately 5 microns ($\mu$m) or less and a width of approximately 10 $\mu$m or less. As another example, one or more portions of the conductive material may be silver or silver-based and similarly have a thickness of approximately 5 $\mu$m or less and a width of approximately 10 $\mu$m or less. This disclosure contemplates any electrodes made of any materials.

In one embodiment, touch sensor array 106 implements a capacitive form of touch sensing. In a mutual-capacitance implementation, touch sensor array 106 may include an array of drive and sense electrodes forming an array of capacitive nodes. A drive electrode and a sense electrode may form a capacitive node. The drive and sense electrodes forming the capacitive node are positioned near each other but do not make electrical contact with each other. Instead, in response to a signal being applied to the drive electrodes for example, the drive and sense electrodes capacitively couple to each other across a space between them. A pulsed or alternating voltage applied to the drive electrode (by touch sensor controller 108) induces a charge on the sense electrode, and the amount of charge induced is susceptible to external influence (such as a touch or the proximity of an object). When an object touches or comes within proximity of the capacitive node, a change in capacitance may occur at the capacitive node and touch sensor controller 108 measures the change in capacitance. By measuring changes in capacitance throughout the array, touch sensor controller 108 determines the position of the touch or proximity within touch-sensitive areas of touch sensor array 106.

In a self-capacitance implementation, touch sensor array 106 may include an array of electrodes of a single type that may each form a capacitive node. When an object touches or comes within proximity of the capacitive node, a change in self-capacitance may occur at the capacitive node and touch sensor controller 108 measures the change in capacitance, for example, as a change in the amount of charge implemented to raise the voltage at the capacitive node by a predetermined amount. As with a mutual-capacitance implementation, by measuring changes in capacitance throughout the array, touch sensor controller 108 determines the position of the touch or proximity within touch-sensitive areas of touch sensor array 106. This disclosure contemplates any form of capacitive touch sensing.

In one embodiment, one or more drive electrodes together form a drive line running horizontally or vertically or in other orientations. Similarly, in one embodiment, one or more sense electrodes together form a sense line running horizontally or vertically or in other orientations. As one particular example, drive lines run substantially perpendicular to the sense lines. Reference to a drive line may encompass one or more drive electrodes making up the drive line, and vice versa. Reference to a sense line may encompass one or more sense electrodes making up the sense line, and vice versa.

In one embodiment, touch sensor array 106 includes drive and sense electrodes disposed in a pattern on one side of a single substrate. In such a configuration, a pair of drive and sense electrodes capacitively coupled to each other across a space between them form a capacitive node. As an example self-capacitance implementation, electrodes of a single type are disposed in a pattern on a single substrate. In addition or as an alternative to having drive and sense electrodes disposed in a pattern on one side of a single substrate, touch sensor array 106 may have drive electrodes disposed in a pattern on one side of a substrate and sense electrodes disposed in a pattern on another side of the substrate. Moreover, touch sensor array 106 may have drive electrodes disposed in a pattern on one side of one substrate and sense electrodes disposed in a pattern on one side of another substrate. In such configurations, an intersection of a drive electrode and a sense electrode forms a capacitive node. Such an intersection may be a position where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates other configurations of electrodes forming nodes. Moreover, this disclosure contemplates other electrodes disposed on any number of substrates in any patterns.

As described above, a change in capacitance at a capacitive node of touch sensor array 106 may indicate a touch or proximity input at the position of the capacitive node. Touch sensor controller 108 detects and processes the change in capacitance to determine the presence and position of the touch or proximity input. In one embodiment, touch sensor controller 108 then communicates information about the touch or proximity input to one or more other components (such as one or more central processing units (CPUs)) of a device that includes touch sensor array 106 and touch sensor controller 108, which may respond to the touch or proximity input by initiating a function of the device (or an application running on the device). Although this disclosure describes a particular touch sensor controller 108 having particular functionality with respect to a particular device and a particular touch sensor 102, this disclosure contemplates other touch sensor controllers having any functionality with respect to any device and any touch sensor.

In one embodiment, touch sensor controller 108 is implemented as one or more integrated circuits (ICs), such as for example general-purpose microprocessors, microcontrollers, programmable logic devices or arrays, application-specific ICs (ASICs). Touch sensor controller 108 comprises any combination of analog circuitry, digital logic, and digital non-volatile memory. In one embodiment, touch sensor controller 108 is disposed on a flexible printed circuit (FPC) bonded to the substrate of touch sensor array 106, as described below. The FPC may be active or passive. In one embodiment, multiple touch sensor controllers 108 are disposed on the FPC.

In an example implementation, touch sensor controller 108 includes a processor unit, a drive unit, a sense unit, and a storage unit. In such an implementation, the drive unit supplies drive signals to the drive electrodes of touch sensor array 106, and the sense unit senses charge at the capacitive nodes of touch sensor array 106 and provides measurement signals to the processor unit representing capacitances at the capacitive nodes. The processor unit controls the supply of drive signals to the drive electrodes by the drive unit and processes measurement signals from the sense unit to detect and process the presence and position of a touch or proximity input within touch-sensitive areas of touch sensor array 106. The processor unit may also track changes in the position of a touch or proximity input within touch-sensitive areas of touch sensor array 106. The storage unit stores programming for execution by the processor unit, including programming for controlling the drive unit to supply drive signals to the drive electrodes, programming for processing measurement signals from the sense unit, and other programming. Although this disclosure describes a particular touch sensor controller 108 having a particular implementation with particular components, this disclosure contemplates touch sensor controller having other implementations with other components.

Tracks 110 of conductive material disposed on the substrate of touch sensor array 106 couple the drive or sense electrodes of touch sensor array 106 to connection pads 112, also disposed on the substrate of touch sensor array 106. As described below, connection pads 112 facilitate coupling of tracks 110 to touch sensor controller 108. Tracks 110 may extend into or around (e.g., at the edges of) touch-sensitive areas of touch sensor array 106. In one embodiment, particular tracks 110 provide drive connections for coupling touch sensor controller 108 to drive electrodes of touch sensor array 106, through which the drive unit of touch sensor controller 108 supplies drive signals to the drive electrodes, and other tracks 110 provide sense connections for coupling touch sensor controller 108 to sense electrodes of touch sensor array 106, through which the sense unit of touch sensor controller 108 senses charge at the capacitive nodes of touch sensor array 106.

Tracks 110 are made of fine lines of metal or other conductive material. For example, the conductive material of tracks 110 may be copper or copper-based and have a width of approximately 100 μm or less. As another example, the conductive material of tracks 110 may be silver or silver-based and have a width of approximately 100 μm or less. In one embodiment, tracks 110 are made of ITO in whole or in part in addition or as an alternative to the fine lines of metal or other conductive material. Although this disclosure describes particular tracks made of particular materials with particular widths, this disclosure contemplates tracks made of other materials and/or other widths. In addition to tracks 110, touch-sensor array 106 may include one or more ground lines terminating at a ground connector (which may be a connection pad 112) at an edge of the substrate of touch sensor array 106 (similar to tracks 110).

Connection pads 112 may be located along one or more edges of the substrate, outside a touch-sensitive area of touch sensor array 106. As described above, touch sensor controller 108 may be on an FPC. Connection pads 112 may be made of the same material as tracks 110 and may be bonded to the FPC using an anisotropic conductive film (ACF). In one embodiment, connection 114 includes conductive lines on the FPC coupling touch sensor controller 108 to connection pads 112, in turn coupling touch sensor controller 108 to tracks 110 and to the drive or sense electrodes of touch sensor array 106. In another embodiment, connection pads 112 are connected to an electromechanical connector (such as, for example, a zero insertion force wire-to-board connector). Connection 114 may or may not include an FPC. This disclosure contemplates any connection 114 between touch sensor controller 108 and touch sensor array 106.

Figure 2:
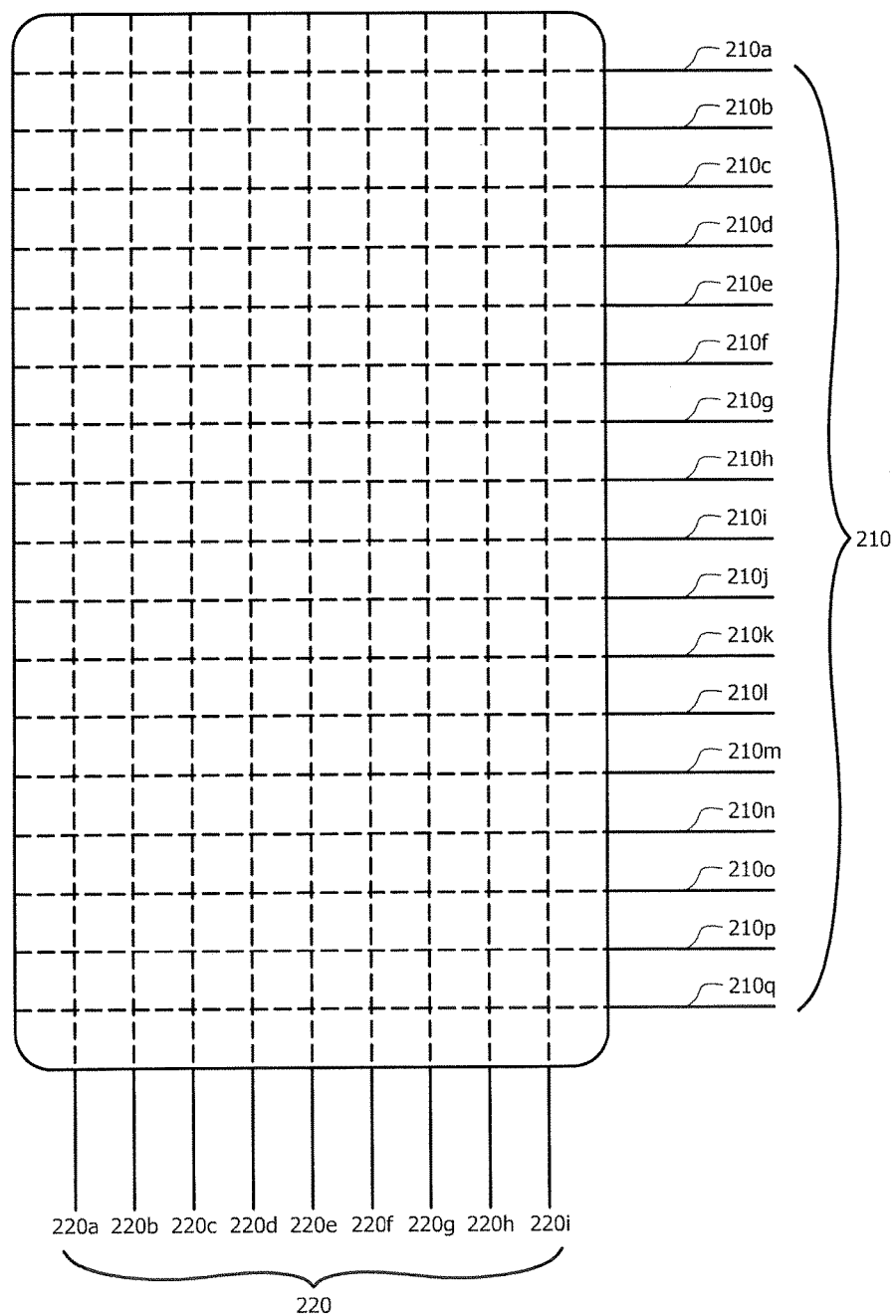
FIG. 2 illustrates an example electrode pattern of electrodes of a touch sensor array, according to an embodiment of the present disclosure.

FIG. 2 illustrates in plan view an example electrode pattern of electrodes 210 and 220 of touch sensor array 200, according to an embodiment of the present disclosure. In one example, touch sensor array 200 corresponds to touch sensor array 106, described above with reference to FIG. 1. Electrodes 210 of touch sensor array 200 are oriented in a first direction and electrodes 220 are oriented in a second direction different from the first direction, such that the touch-sensitive area of touch sensor array 200 is defined by the two-dimensional array of electrodes 210 and electrodes 220. In the illustrated example, the first direction and the second direction are perpendicular to each other. Electrodes 210 and electrodes 220 may be described based on their orientation in touch sensor array 200. For example, electrodes oriented along a horizontal direction (electrodes 210a-q in the illustrated example) may be referred to as x-electrodes and electrodes oriented along a vertical direction (electrodes 220a-i in the illustrated example) may be referred to as y-electrodes. As another example, electrodes oriented along a horizontal direction (electrodes 210a-q in the illustrated example) may be referred to as x-lines and electrodes oriented along a vertical direction (electrodes 220a-i in the illustrated example) may be referred to as y-lines.

Electrodes 210 and electrodes 220 overlap at points along the electrodes. In a mutual capacitive mode of operation, capacitive nodes are formed at areas where electrodes 210 and 220 overlap when the electrodes in a first direction (e.g., electrodes 210) operate as drive electrodes and the electrodes in a second direction (e.g., electrodes 220) operate as sense electrodes and when a drive signal is applied to the electrodes operating as drive electrodes.

In one embodiment, electrodes 210 and electrodes 220 are disposed on the same side of a substrate. In such embodiments, to ensure that electrodes 210 and electrodes 220 are electrically isolated from one another, electrodes 210 and electrodes 220 are separated by a dielectric or other material at points where electrodes 210 and electrodes 220 overlap. In certain other embodiments, electrodes 210 and electrodes 220 are disposed on opposing sides of a substrate, the substrate being made of a dielectric or other material that electrically isolates electrodes 210 and electrodes 220 from one another. In certain other embodiments, electrodes 210 and electrodes 220 are disposed on respective surfaces of different substrates, which are positioned with respect to each other such that electrodes 210 and electrodes 220 are electrically isolated from each other at points where electrodes 210 and electrodes 220 overlap. For example, one or more of the substrates may be positioned between electrodes 210 (positioned on one of the substrates) and electrodes 220 (positioned on the other of the substrates) or an additional substrate, such as a dielectric substrate, or air gap is sandwiched between the two substrates on which electrodes 210 and electrodes 2220 are formed.

In a self-capacitance configuration, electrodes 210 and electrodes 220 of touch sensor array 200 may operate as a single type such that they each form a capacitive node. Although this disclosure describes touch sensor array 200 having particular configurations of particular electrodes, this disclosure contemplates other configurations of electrodes. For example, electrodes 210 of touch sensor array 200 may operate as sense electrodes and electrodes 220 of touch sensor array 200 may operate as drive electrodes.

It should be understood that FIG. 2 illustrates just one example touch sensor array 200 that may be used according to certain embodiments of the present disclosure. The present disclosure contemplates using other types of touch sensor arrays, which may have different configurations and types of operation.

Figure 3:
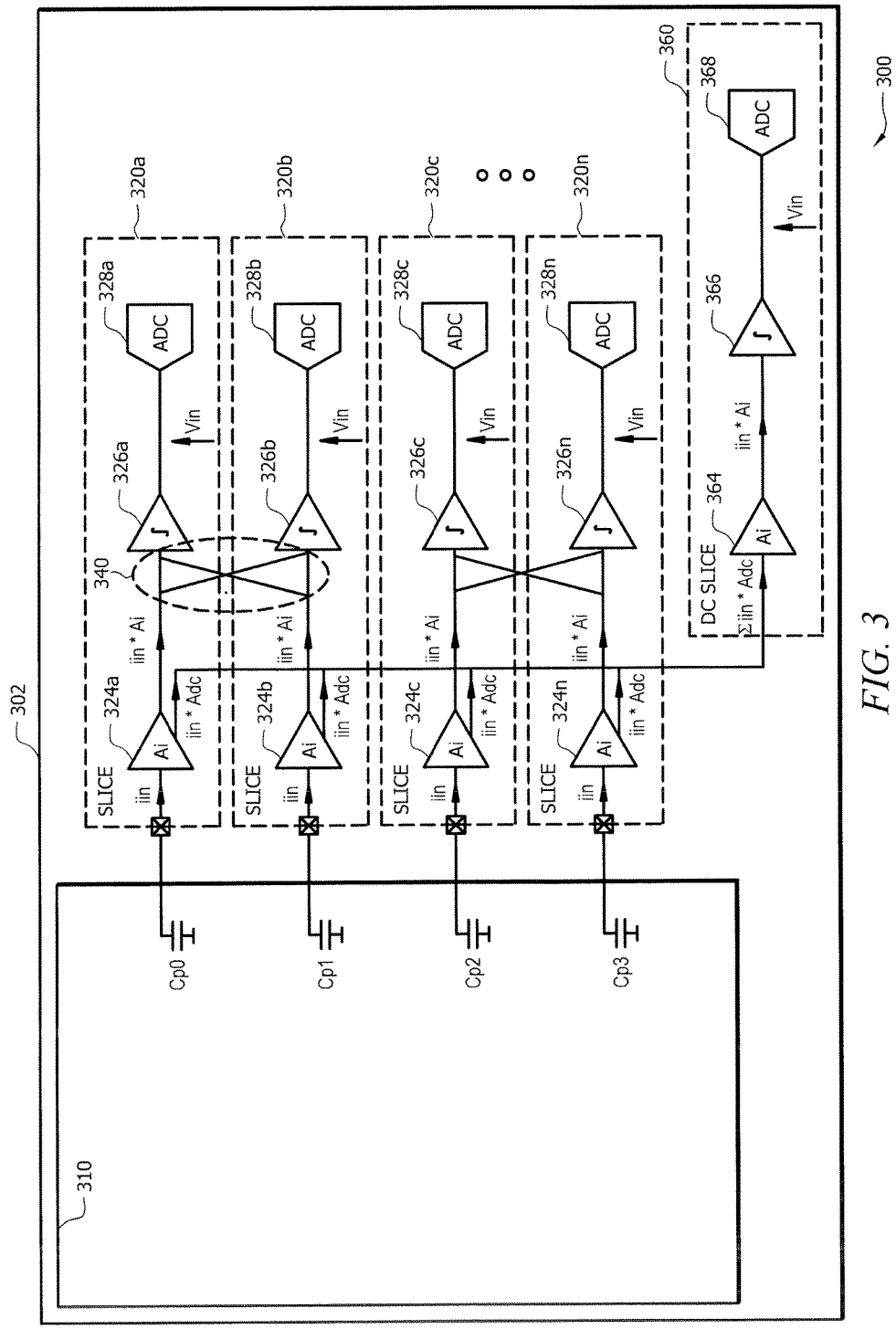
FIG. 3 illustrates an example system for a power mode configuration for a touch sensor, according to an embodiment of the present disclosure.

FIG. 3 illustrates an example system 300 for a power mode configuration for a touch sensor 302, according to an embodiment of the present disclosure. In one example, system 300 corresponds to system 100 and touch sensor 302 corresponds to touch sensor 102, described above with reference to FIG. 1.

Touch sensor controller 108, and thereby touch sensor 102, may operate in a variety of power modes. In an embodiment, a power mode reflects one or more of the amount of power consumed by one or more components of a device housing touch sensor 102, an amount of power provided to one or more components of a device housing touch sensor 102, and the components of the device housing touch sensor 102 to which power is provided.

As a first example of a power mode, touch sensor controller 108 may at times operate in a first power mode, which may be referred to as an idle power mode. In one embodiment, an idle power mode of touch sensor controller 108 includes, either exclusively or non-exclusively, when certain touch scanning operations of touch sensor controller 108 are powered down. As an example, one or more components (e.g., integrators 326a-n and ADCs 328a-n of measurement circuits 320a-n) of touch sensor 302 may be powered down in idle power mode. In such an example, touch sensor controller 108 may be in a state where it receives power for scanning touch sensor array 106 for detecting some activity but does not receive power for scanning of touch sensor array 106 to detect the location of the activity or the nature of the activity. Detecting some activity may include detecting a potential touch, such as the presence of an object (e.g., a finger or a stylus), on or a device. In certain embodiments, idle power mode differs from a deep sleep power mode. In deep sleep power mode, touch sensor 102 is not required to sense touch sensor array 106 for activity. While an example idle power mode in which certain touch scanning operations are powered down has been described, the present disclosure contemplates different and or additional operations of touch sensor 102 being powered down in the idle power mode.

Touch sensor 102 may enter this idle power mode in a variety of situations. For example, touch sensor 102 may enter idle power mode when a device that houses touch sensor 102 enters a standby mode. As another example, touch sensor 102 may enter idle power mode when touch sensor 102 has not detected the presence of an object (e.g., a finger or a stylus contacting or otherwise within a detectable range of touch sensor 102) for some predetermined period of time. This situation could be encountered, for example, if the device that houses touch sensor 102 is being used for some background application (e.g., playing music) but the user of the device is otherwise not interacting with touch sensor 102 of device 200.

As a second example of a power mode, a second power mode may refer to an active power mode in which power is provided to touch sensor 102 (e.g., to touch sensor controller 108) for determining spatial information (e.g., a location of one or more touches and/or the number of touches) and/or touch classification information (e.g., whether the nature of the touch is a finger, glove, or stylus). As an example, integrators 326a-n and ADCs 328a-n of measurement circuits 320a-n of touch sensor 302 may be powered on in active power mode.

System 300 of FIG. 3 may be used by one or more devices to improve the idle power consumption of the device. A device is any personal digital assistant, cellular telephone, smartphone, tablet computer, automatic teller machines (ATMs), home appliances, personal computers, and any other device having a touch screen. In the illustrated example, components of system 300 are internal to the device.

In the illustrated example, system 300 includes touch sensor 302, touch sensor array 310, measurement circuits 320a-n, and a direct current (DC) circuit 360. In one example, touch sensor array 310 corresponds to touch sensor array 106, described above with reference to FIG. 1.

Each measurement circuit 320a-n is be coupled to one or more electrodes of touch sensor array 310 (e.g., electrodes 210 and/or 220 of touch sensor array 200 of FIG. 2). For example, measurement circuit 320a may be coupled to electrode 220a of touch sensor array 200, measurement circuit 320b may be coupled to electrode 220b of touch sensor array 200, measurement circuit 320c may be coupled to electrode 220c of touch sensor array 200, and the like. Measurement circuits 320a-n are configured to sense charges flowing into electrodes 210 and/or 220. In one embodiment, system 300 includes a drive circuit that transmits a drive signal, such as a voltage signal, to one or more electrodes of touch sensor 310.

In one embodiment, system 300 performs self-capacitance sensing in idle power mode. In certain embodiments, measurement circuits 320a-n may include one or more drive circuits. During self-capacitance sensing, the one or more drive circuits of measurement circuits 320a-n may apply a signal (e.g., a voltage signal) to each respective electrode to which each measurement circuit 320a-n is coupled (e.g., electrodes 220a-i of touch sensor array 200) such that the measurement circuits 320a-n drive and sense the electrodes. The electrodes may be driven one after another (i.e., sequentially) or at substantially the same time (i.e., simultaneously). In some embodiments, the electrodes are driven and sensed at the same time. In certain embodiments, in the idle power mode the electrodes in one direction (e.g., electrodes 220a-i of touch sensor array 200) are driven and sensed to reduce power consumption of system 300. It should be understood, however, that the present disclosure contemplates driving and sensing electrodes in both directions (e.g., the x-direction and y-direction) in the idle power mode.

In one embodiment, in response to detecting some activity (e.g., a potential touch) on touch sensor 302, system 300 transitions from self-capacitance sensing to mutual-capacitance sensing to measure spatial information (e.g., a location of one or more touches and/or the number of touches) and/or touch classification information (e.g., whether the nature of the touch is a finger, glove, or stylus). During mutual-capacitance sensing, each drive electrode (e.g., electrodes 210a-q of touch sensor array 200) may be stimulated, and measurement circuits 320a-n may measure each sense electrode (e.g., electrodes 220a-i of touch sensor array 200). Measurements may include charges present on the sense electrodes and/or changes in the sense electrodes (e.g., changes in capacitance, voltage, current, charge, or any other suitable measurement indicating the capacitance at a capacitive node, such as a change in capacitance.)

System 300 may then transition back to self-capacitance sensing to conserve power. This transition may be triggered by one or more events (e.g., system 300 determines that no activity has occurred on touch sensor 302 within a pre-determined amount of time, system 300 is configured for mutual-capacitance sensing for a pre-determined amount of time, or system 300 determines one or more measurements). In one embodiment, measurement circuits 320a-n may be remapped to drive electrodes (e.g., electrodes 210a-q) or self-capacitance sensing. As an example, measurement circuits 320a-n that are respectively coupled to electrodes 220a-i of touch sensor array 200 during mutual-capacitance sensing may be decoupled (e.g., electrically disconnected) from electrodes 220a-i and coupled (e.g., electrically connected) to electrodes 210a-q of touch sensor array 200 when system 300 transitions to self-capacitance sensing to perform sensing of electrodes 210a-q.

Each signal measured from a particular electrode receiving a drive signal may include both a touch capacitance and a parasitic capacitance, Cp (e.g., $Cp_{0-3}$ of FIG. 3). The parasitic capacitance may include the capacitance of the tracks in the silicon or tracks on the printed circuit board (PCB). As an example, the capacitance provided by an object providing the touch or proximity input may add 5-10% of the capacitance sensed at the particular electrode.

In the illustrated embodiment of FIG. 3, measurement circuit 320a includes an amplifier 324a, an integrator 326a, and an ADC 328a. In certain embodiments, amplifier 324a is a current input amplifier with an associated current gain Ai. In the illustrated embodiment of FIG. 3, amplifier 324a receives an incoming current $i_{in}$ from an electrode (e.g., electrode 220a) and amplifies the incoming current $i_{in}$ to provide output current $i_{in}*A_i$ that is transmitted to integrator 326a. Integrator 326a integrates the output current from amplifier 324a to generate a voltage $V_{in}$ that is proportional to the output current. Output voltage $V_{in}$ from integrator 326a is transmitted to ADC 328a, wherein ADC 328a digitizes output voltage $V_{in}$. Measurement circuits 320b-n of FIG. 3 are analogous to measurement circuit 320a. As an example, measurement circuit 320b includes an amplifier 324b, an integrator 326b, and an ADC 328b, wherein amplifier 324b receives an incoming current $i_{in}$ from an electrode (e.g., electrode 220b). The total current consumption for each measurement circuit 320a-n (i.e., each slice) may be represented by the following equation:

$$I_{slice} = I_{Ai} * I_{int} * I_{ADC} \qquad \text{[Equation 1]}$$

wherein:

$I_{slice}$=current consumption for each measurement circuit (e.g., measurement circuits 320a-n);

$I_{Ai}$=current consumption for each amplifier (e.g., amplifiers 324a-n);

$I_{int}$=current consumption for each integrator (e.g., integrators 326a-n); and $I_{ADC}$=current consumption for each ADC (e.g., ADC 328a-n).

Although this disclosure describes particular measurement circuits 320a-n having particular implementations with particular components, this disclosure contemplates measurement circuits having other implementations with other components. For example, measurement circuits 320a-n may include additional components not illustrated in FIG. 3. As another example, the components of measurement circuits 320a-n may be configured in a different order than the order illustrated in FIG. 3.

In the illustrated embodiment of FIG. 3, system 300 provides differential sensing to remove pedestal (i.e., offset) capacitance from the electrode lines during self-capacitance implementation. For example, a differential connection 340 may connect measurement circuit 320a to measurement circuit 320b such that currents are subtracted between the two measurement circuits. A drawback of differential sensing is that the DC level of the measurement is lost. To recover this lost information, a small part of the input current $i_{in}*A_{DC}$ of each measurement circuit 320a-n is sent to an additional measurement circuit, DC circuit 360. For example, amplifier 324a of measurement circuit 320a may be configured to generate dual outputs. Amplifier 324a may output a first output signal $i_{in}*A_i$ that is transmitted to and received by integrator 326a and a second output signal $i_{in}*A_{DC}$ that is transmitted to and received by DC circuit 360. In one embodiment, DC circuit 360 integrates the sum of the current coming from measurement circuits 320a-n to recreate the DC level information.

In one embodiment, DC circuit 360 is a monitoring circuit that includes an amplifier 364, an integrator 366, and an ADC 368. DC circuit 360 may be coupled to measurement circuits 320a-n. For example, amplifier 364a of DC circuit 360 may be coupled to amplifiers 324a-n of measurement circuits 320a-n. In certain embodiments, amplifier 364 is a current amplifier with an associated current gain Ai. In the illustrated embodiment of FIG. 3, DC circuit 360 receives signals from each of measurement circuits 320a-n and generates an output signal that is proportional to the sum of the signals received from measurement circuits 320a-n. For example, amplifier 364 of DC circuit 360 may receive an incoming current $i_{in}*A_{DC}$ from each of measurement circuits 320a-n within a pre-determined amount of time, resulting in an incoming current of $\Sigma i_{in}*A_{DC}$. Amplifier 364 of DC circuit 360 then amplifies incoming current $\Sigma i_{in}*A_{DC}$ to provide output current $i_{in}*A_i$ that is transmitted to integrator 366. Integrator 366 integrates the output current from amplifier 366 to generate a voltage $V_{in}$ that is proportional to output current $i_{in}*A_i$. Output voltage $V_{in}$ from integrator 366 is transmitted to ADC 368, wherein ADC 368 digitizes output voltage $V_{in}$. This digitized output value indicates whether some activity has occurred on the touch sensor.

Although this disclosure describes a particular DC circuit 360 having particular implementations with particular components, this disclosure contemplates any monitoring circuit having other implementations with other components. For example, DC circuit 360 may include additional components not illustrated in FIG. 3. As another example, the components of DC circuit 360 may be configured in a different order than the order illustrated in FIG. 3.

In the illustrated example embodiment of FIG. 3, amplifiers 324a-n of measurement circuits 320a-n are activated during idle consumption mode, wherein integrators 326a-n and ADCs 328a-n are deactivated to reduce the power consumption of operating system 300 during idle sensing. Because ADCs 328a-n of measurement circuits 320a-n are deactivated, system 300 does not receive values from ADCs 328a-n. DC circuit 360 is activated during idle consumption mode such that system 300 receives one value from ADC 368 of DC slice 360. This value may represent the sum of all signals received from electrodes 220a-i of touch sensor array 200. Since spatial information is not required, sensing of electrodes 210a-q is not required. For example, if a finger is approaching touch sensor 310, the value from ADC 368 may change. The detection of some activity (e.g., the approaching finger) may activate the full system such that regular touch sensing (e.g., touch location, number of touches, and/or nature of the touch) is performed.

The value received from ADC 368 indicates whether touch sensor 310 has detected some activity. For example, a value above a certain threshold may indicate a presence of a touch input. Once some activity has been detected, the full system may be activated so that system 300 can measure spatial information and touch classification information. As just one example, integrators 326a-n and ADCs 328a-n are activated such that system 300 receives values from ADCs 328a-n of measurement circuits 320a-n as well as a value from ADC 368 of DC circuit 360. In one embodiment, system 300 transitions from self-capacitance sensing to mutual-capacitance sensing upon detecting some activity from touch sensor 310.

Current consumption of system 300 in idle consumption mode may be less than ten percent of current consumption of system 300 when system 300 is fully activated. In just one example embodiment, the total current consumption of system 300 during idle consumption mode with integrators 326a-n and ADCs 328a-n deactivated is one-twelfth of the total current consumption during idle consumption mode with integrators 326a-n and ADCs 328a-n activated. Equation 2 illustrates an example equation for computing total current consumption during idle consumption mode when amplifiers 326a-n, integrators 326a-n, and ADCs 328a-n of measurement circuits 320a-n are activated:

$$I_{tot} = (I_{slice} * n_y + I_{DCslice}) * (1 + \text{ceiling } n_x/n_y)) * t_{sample} * n_{avg} * f_{refresh} \qquad \text{[Equation 2]}$$

wherein:

$L_{tot}$=total current consumption in idle mode;

$I_{slice}$=current consumption for each measurement circuit (e.g., measurement circuits 320a-n);

$n_y$=number of Y electrodes (e.g., number of electrode lines 220a-220i);

$n_x$=number of X electrodes (e.g., number of electrode lines 210a-210q);

$I_{DCslice}$=current consumption for a monitoring circuit (e.g., DC circuit 360);

$t_{sample}$=sensing time for one sample;

$n_{avg}$=average number of samples per measurement used for noise averaging; and $f_{refresh}$=touch sensor scan frequency.

As just one example calculation for Equation 2:

$$I_{tot}=((1*10^{-3}*9+1*10^{-3})*(1+\text{ceiling } 17/9))*(15*10^{-6})*64*20$$

$$I_{tot}=576 \text{ microamperes (}\mu\text{A)}$$

wherein:
$I_{slice}$=1 milliampere (mA) (1/3 for amplifier, 1/3 for integrator, and 1/3 for ADC);
$n_y$=9;
$n_x$=17;
$I_{DCslice}$=1 mA;
$t_{sample}$=15 microseconds ($\mu$s);
$n_{avg}$=64; and
$f_{refresh}$=20 hertz (Hz).

Equation 3 illustrates an example equation for computing total current consumption during idle consumption mode when system 300 has been modified to reduce power consumption such that amplifiers 326a-n of measurement circuits 320a-n are activated and integrators 326a-n and ADCs 328a-n of measurement circuits 320a-n are deactivated:

$$I_{tot\_idle}=(I_{Ailow}*n_y+I_{DC})*t_{sample}*n_{avg}*f_{refresh} \quad \text{[Equation 3]}$$

wherein:
$I_{tot\_idle}$=total current consumption in idle mode; and
$I_{Ailow}$=amplifier current consumption for the amplifier in idle mode.

As just one example calculation for Equation 3:

$$I_{tot\_idle}=(0.166*10^{-3}*9+1*10^{-3})*15*10^{-6}*64*20$$

$$I_{tot\_idle}=48 \text{ }\mu\text{A}$$

wherein:
$I_{Ailow}$=0.166 mA (50% of ⅓ amplifier is required);
$n_y$=9;
$I_{DC}$=1 mA;
$t_{sample}$=15 $\mu$s;
$n_{avg}$=64; and
$f_{refresh}$=20 Hz.

As shown in the above example calculations for Equations 2 and 3, total current consumption $I_{tot}$ during idle consumption mode when integrators 326a-n and ADCs 328a-n of system 300 are activated is approximately 576 $\mu$A, whereas total current consumption $I_{tot\_idle}$ of modified system 300 when integrators 326a-n and ADCs 328a-n are deactivated is approximately 48 $\mu$A, which is one-twelfth of the consumption of the fully activated system. Whereas original system 300 with activated integrators 326a-n and ADCs 328a-n may measure spatial information (e.g., x and y coordinates of a touch position), modified system 300 with deactivated integrators 326a-n and ADCs 328a-n may be measure some activity rather than a specific touch position. In certain embodiments, modified system 300 may sense the electrodes of system 300 at one time as one capacitance. In both the original system and the modified system of the above examples, amplifier 364, integrator 366, and ADC 368 of DC circuit 360 are fully activated. In the modified system, the amplifier consumes approximately fifty percent of its maximum current consumption, which reduces the current consumption of the amplifier from 0.333 mA for the original system to 0.166 mA for the modified system. In some embodiments, touch sensor scan frequency $f_{refresh}$ can be reduced in the modified system as compared to the original system.

Equations 1 through 3 are provided as examples only. The present disclosure contemplates equations including additional or fewer variables and other techniques for determining current consumption, according to particular needs.

Figure 4:
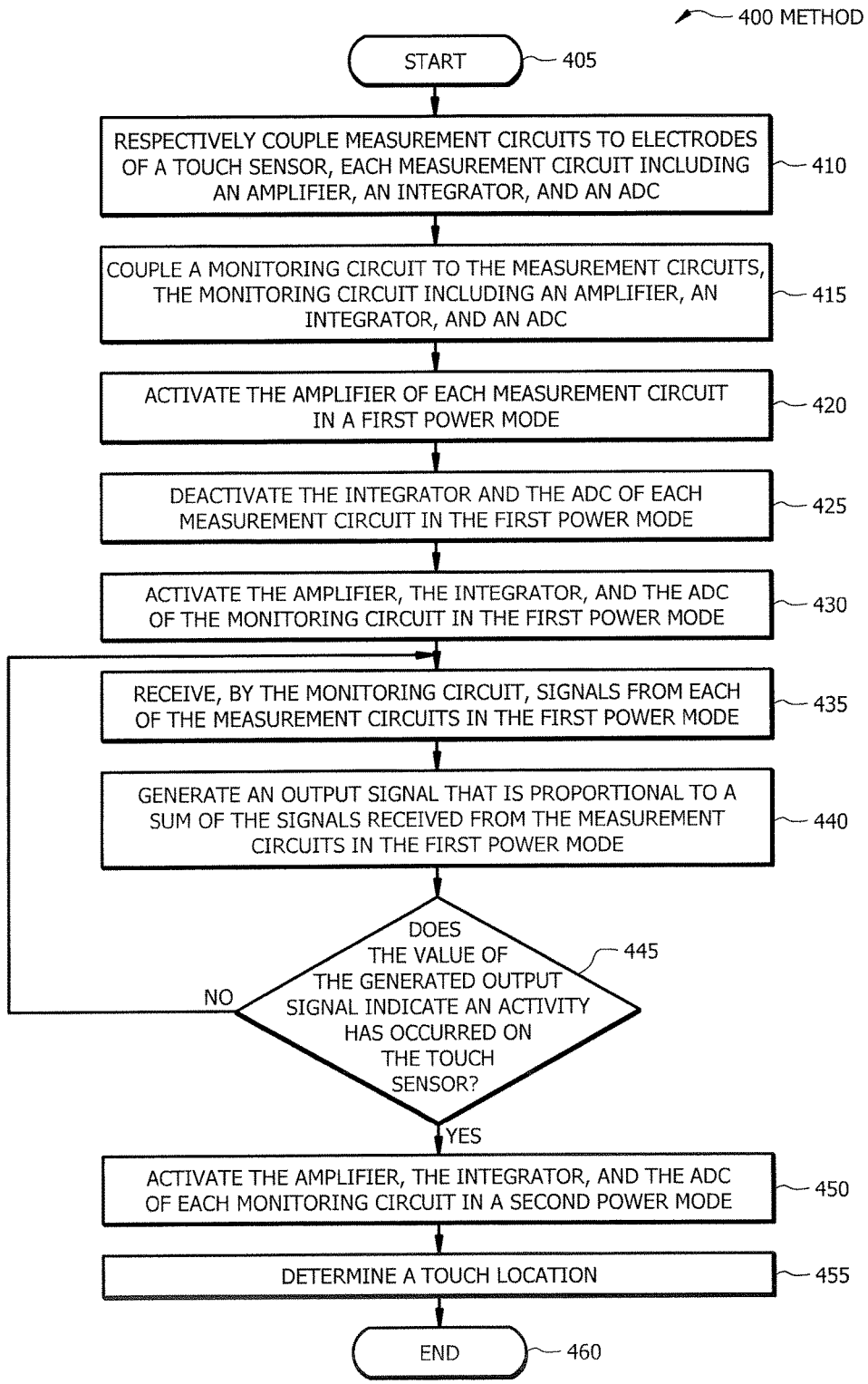
FIG. 4 illustrates an example method for configuring a power mode for a touch sensor, according to an embodiment of the present disclosure.

FIG. 4 illustrates an example method 400 for configuring a power mode for a touch sensor, according to an embodiment of the present disclosure. Method 400 starts at step 405. At step 410, a controller (e.g., controller 108 of FIG. 1) respectively couples measurement circuits (e.g., measurement circuits 320a-n) to electrodes (e.g., electrode lines 220a-i) of a touch sensor (e.g., touch sensor 310) of a device. Each measurement circuit may include a first component, a second component, and a third component. In one embodiment, the first component is an amplifier (e.g., amplifier 324a), the second component is an integrator (e.g., integrator 326a), and the third component is an ADC (e.g., ADC 328a). At step 415 of FIG. 4, the controller couples a monitoring circuit to the measurement circuits. In some embodiments, the monitoring circuit is a DC circuit (e.g., DC circuit 360). The monitoring circuit includes a first component, a second component, and a third component. In one embodiment, the first component of the monitoring circuit is an amplifier (e.g., amplifier 364), the second component of the monitoring circuit is an integrator (e.g., integrator 366), and the third component of the monitoring circuit is an ADC (e.g., ADC 368).

At step 420 of method 400, the controller activates the first component of each of the measurement circuits. As an example, controller 108 may activate amplifiers 324a-n such that amplifiers 324a-n are powered on in a first power mode. In one embodiment, the activated amplifiers consume approximately fifty percent of the amplifier's maximum current consumption. At step 425 of method 400, the controller deactivates the integrators and the ADCs of each measurement circuit. For instance, controller 108 may power off integrators 326a-n and ADCs 328a-n in the first power mode. At step 430, the controller activates the three components of the monitoring circuit. For example, controller 108 of FIG. 1 may activate amplifier 364, integrator 366, and ADC 368 of DC circuit 360.

The monitoring circuit of method 400 may perform one or more operations in the first power mode. As illustrated in step 435, the monitoring circuit may receive signals from each of the measurement circuits. In one embodiment, DC circuit 360 receives a signal from each integrator 324a-n of measurement circuits 320a-n. At step 440 of method 400, the monitoring circuit generates an output signal that is proportional to a sum of the signals received from the measurement circuits. For example, ADC 368 of DC circuit 360 may digitize a value representative of an output voltage from integrator 366, wherein the value is proportional to the sum of the current consumption of each measurement circuit.

Method 400 then moves to step 445, where the controller determines whether the value of the generated output signal indicates an activity has occurred on the touch sensor. For example, the controller may determine whether the value is above a pre-determined threshold. If the value of the generated output signal fails to indicate an activity has occurred on the touch sensor (e.g., the value is below a pre-determined threshold), method 400 moves back to step 435. If the value indicates activity has occurred on the touch sensor (e.g., the value is at or above a pre-determined threshold), method 400 proceeds to step 450, where all three components of the measurement circuits are activated in a second power mode. For example, controller 180 may activate amplifiers 324a-n, integrators 326a-n, and ADCs 328a-n of measurement circuits 320a-n such that spatial and touch classification information can be determined. At step 455 of method 400, the controller determines a location of a touch.

In one embodiment, the controller may additionally or alternatively determine a number of touches or the nature of the touches (e.g., a finger, glove, or stylus.) Method 400 ends at step 460.

In certain embodiments, method 400 may transition from second power mode to first power mode. For example, after activating the components of each monitoring circuit for the second power mode in step 450, method 400 may revert back to step 420, where the amplifier of each measurement circuit is activated in the first power mode (e.g., fifty percent of maximum current consumption) and the integrators and ADCs of each measurement circuit are deactivated in the first power mode. This transition from second power mode to first power mode may be triggered by one or more events, such as a determination by the system that no activity has occurred on the touch sensor within a pre-determined amount of time.

FIG. 4 illustrates just one example method 400 for configuring a power mode for a touch sensor, and the present disclosure contemplates other implementations of the method. For example, one or more of the integrators or ADCs of the measurement circuits may be activated during the first power mode. As another example, the measurement circuits may be remapped such that they are coupled to different electrodes depending on whether self-capacitance implementation or mutual-capacitance implementation is being used. As still another example, method 400 may transition from the first power mode to the second power mode based on a time frequency rather than an indication of touch activity.

Although this disclosure describes and illustrates particular steps of the methods of FIG. 4 as occurring in a particular order, this disclosure contemplates any steps of the methods of FIG. 4 occurring in any order. For example, steps 410 and 415 of FIG. 4 may occur simultaneously. An embodiment may repeat one or more steps of the methods of FIG. 4. Moreover, although this disclosure describes and illustrates an example method for configuring a power mode for a touch sensor including the particular steps of the method of FIG. 4, this disclosure contemplates any method for configuring a power mode for a touch sensor including any steps, which may include all, some, or none of the steps of the method of FIG. 4. Moreover, although this disclosure describes and illustrates particular components performing particular steps of the method of FIG. 4, this disclosure contemplates any combination of any components performing any steps of the method of FIG. 4.

Embodiments of the present disclosure may provide one or more technical advantages. An embodiment of the present disclosure conserves power that would otherwise be consumed by a device. For example, rather than configuring the device to detect spatial information and/or touch classification information in idle power mode, an embodiment of the present disclosure configures the device to detect limited touch activity to conserve power. Transitioning touch sensor 102 from a first power mode to a second power mode upon detection of some activity may reduce or eliminate reasons to power one or more components of touch sensor 102 during idle power mode. In one embodiment, the components of a device collectively consume less power than would otherwise be used to power the device to detect a location of a touch, the number of touches, or the nature of the touch.

Certain embodiments of the present disclosure may include none, some, or all of the above technical advantages. One or more other technical advantages may be readily apparent to one skilled in the art from the figures, descriptions, and claims included herein.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other computer-readable non-transitory storage media, or any combination of two or more of these. A computer-readable non-transitory storage medium may be volatile, non-volatile, or a combination of volatile and non-volatile.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Additionally, components referred to as being "coupled" includes the components being directly coupled or indirectly coupled.

This disclosure encompasses a myriad of changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
    a touch sensor comprising a plurality of electrodes;
    a plurality of measurement circuits respectively coupled to the plurality of electrodes of the touch sensor, each measurement circuit comprising a first component, a second component, and a third component, wherein:
        the first component of each measurement circuit is activated in a first power mode; and
        the second component and the third component of each measurement circuit are deactivated in the first power mode; and
    a monitoring circuit coupled to the first component of each measurement circuit, the monitoring circuit comprising a first component, a second component, and a third component, wherein:
        the first component, the second component, and the third component of the monitoring circuit are activated in the first power mode; and the monitoring circuit is configured to perform operations in the first power mode comprising:
receiving respective signals from the plurality of measurement circuits; and
generating an output signal that is proportional to a sum of the signals received from the plurality of measurement circuits, a value of the generated output signal indicating whether activity has occurred on the touch sensor.

2. The system of claim 1, further comprising a differential connection between a first measurement circuit and a second measurement circuit of the plurality of measurement circuits, wherein the differential connection is configured to subtract currents between the first measurement circuit and the second measurement.

3. The system of claim 1, wherein:
the first component, the second component, and the third component of each measurement circuit are activated in a second power mode;
the first component, the second component, and the third component of the monitoring circuit are activated in the second power mode; and
current consumption of the system in the first power mode is less than ten percent of current consumption of the system in the second power mode.

4. The system of claim 1, wherein:
the first component of each measurement circuit is a current input amplifier;
the second component of each measurement circuit is an integrator; and
the third component of each measurement circuit is an analog-to-digital converter ("ADC").

5. The system of claim 1, wherein the system is configured to:
perform self-capacitance scanning in the first power mode;
transition, when the value of the generated output signal indicates activity has occurred on the touch sensor, from the first power mode to a second power mode by activating the second component and the third component of each measurement circuit;
perform mutual-capacitance scanning in the second power mode; and
determine a touch location and a number of touches in the second power mode.

6. The system of claim 1, wherein the monitoring circuit is configured to receive the respective signals from the plurality of measurement circuits from a current input amplifier of each of the measurement circuits, each signal comprising an unamplified direct current level from the respective electrode to which the measurement circuit is coupled.

7. The system of claim 1, wherein the first component of each measurement circuit consumes approximately fifty percent of its maximum current consumption in the first power mode.

8. The system of claim 1, wherein:
the first component of the monitoring circuit is a current input amplifier;
the second component of the monitoring circuit is an integrator; and
the third component of the monitoring circuit is an ADC.

9. A non-transitory computer-readable medium embodying logic, the logic configured to, when executed by one or more processors, cause the one or more processors to perform operations comprising:
respectively coupling a plurality of measurement circuits to a plurality of electrodes of a touch sensor of a device, each measurement circuit comprising a first component, a second component, and a third component;
coupling a monitoring circuit to first component of each measurement circuit, the monitoring circuit comprising a first component, a second component, and a third component;
activating the first component of each measurement circuit in a first power mode;
deactivating the second component and the third component of each measurement circuit in the first power mode;
activating the first component, the second component, and the third component of the monitoring circuit in the first power mode; and
performing operations in the first power mode comprising:
receiving, by the monitoring circuit, respective signals from the plurality of measurement circuits; and
generating an output signal that is proportional to a sum of the signals received from the plurality of measurement circuits, a value of the generated output signal indicating whether activity has occurred on the touch sensor.

10. The non-transitory computer-readable medium of claim 9, wherein the operations further comprise:
connecting, by a differential connection, a first measurement circuit of the plurality of measurement circuits to a second measurement circuit of the plurality of measurement circuits; and
subtracting, by the differential connection, currents between the first measurement circuit and the second measurement circuit.

11. The non-transitory computer-readable medium of claim 9, wherein the operations further comprise:
activating the first component, the second component, and the third component of each measurement circuit in a second power mode; and
activating the first component, the second component, and the third component of the monitoring circuit in the second power mode;
wherein current consumption of the system in the first power mode is less than ten percent of current consumption of the system in the second power mode.

12. The non-transitory computer-readable medium of claim 9, wherein:
the first component of each measurement circuit is a current input amplifier;
the second component of each measurement circuit is an integrator; and
the third component of each measurement circuit is an analog-to-digital converter ("ADC").

13. The non-transitory computer-readable medium of claim 9, wherein the operations further comprise:
performing self-capacitance scanning when the system is in the first power mode;
transitioning from the first power mode to a second power mode when the value of the generated output signal indicates activity has occurred on the touch sensor by activating the second component and the third component of each measurement circuit;
performing mutual-capacitance scanning when the system is in the second power mode; and
measuring spatial information and touch classification information in the second power mode.

14. The non-transitory computer-readable medium of claim 9, wherein the respective signals are received from the plurality of measurement circuits from a current input amplifier of each of the measurement circuits, each signal comprising an unamplified direct current level from the respective electrode to which the measurement circuit is coupled.

15. The non-transitory computer-readable medium of claim 9, wherein the first component of each measurement circuit consumes approximately fifty percent of its maximum current consumption in the first power mode.

16. The non-transitory computer-readable medium of claim 9, wherein:
- the first component of the monitoring circuit is a current input amplifier;
- the second component of the monitoring circuit is an integrator; and
- the third component of the monitoring circuit is an ADC.

17. A method, comprising:
- respectively coupling a plurality of measurement circuits to a plurality of electrodes of a touch sensor of a device, each measurement circuit comprising a first component, a second component, and a third component;
- coupling a monitoring circuit to the first component of each measurement circuit, the monitoring circuit comprising a first component, a second component, and a third component;
- activating the first component of each measurement circuit in a first power mode;
- deactivating the second component and the third component of each measurement circuit in the first power mode;
- activating the first component, the second component, and the third component of the monitoring circuit in the first power mode; and
- performing operations in the first power mode comprising:
    - receiving, by the monitoring circuit, respective signals from the plurality of measurement circuits; and
    - generating an output signal that is proportional to a sum of the signals received from the plurality of measurement circuits, a value of the generated output signal indicating whether activity has occurred on the touch sensor.

18. The method of claim 17, further comprising:
- connecting, by a differential connection, a first measurement circuit of the plurality of measurement circuits to a second measurement circuit of the plurality of measurement circuits; and
- subtracting, by the differential connection, currents between the first measurement circuit and the second measurement circuit.

19. The method of claim 17, further comprising:
- activating the first component, the second component, and the third component of each measurement circuit in a second power mode; and
- activating the first component, the second component, and the third component of the monitoring circuit in the second power mode;
- wherein current consumption of the system in the first power mode is less than ten percent of current consumption of the system in the second power mode.

20. The method of claim 17, wherein:
- the first component of each measurement circuit is a current input amplifier;
- the second component of each measurement circuit is an integrator; and
- the third component of each measurement circuit is an analog-to-digital converter ("ADC").

* * * * *